Patented Aug. 1, 1950

2,516,836

UNITED STATES PATENT OFFICE 2,516,836

N-UNSATURATED HYDROCARBON, N'-PHTHALOYL SUBSTITUTED UREA AND POLYMERS THEREOF

Erhart K. Drechsel, Stamford, and Walter M. Thomas, Springdale, Conn., assignors to American Cyanamid Company, New York, N. Y., a corporation of Maine No Drawing. Application May 25, 1949, Serial No. 95,382

14 Claims. (Cl. 260—77.5)

This invention relates to new and useful chemical compounds, more particularly unsaturated nitrogenous compounds, and to various compositions of matter produced from such compounds. The invention is especially concerned with new substituted ureas and products (especially copolymers or interpolymers) produced therefrom, and with methods of making the same. Still more particularly the invention relates to chemical compounds (substituted ureas) corresponding to the general formula

I

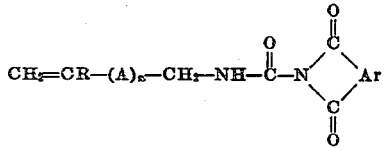

where R represents a member of the class consisting of hydrogen and the methyl radical, A represents a member of the class consisting of divalent saturated aliphatic hydrocarbon radicals, divalent saturated aliphatic-substituted aromatic hydrocarbon radicals and divalent aromatic-substituted saturated aliphatic hydrocarbon radicals, Ar represents a member of the class consisting of phenylene, dihydrophenylene, tetrahydrophenylene and hexahydrophenylene radicals, and $n$ represents a value selected from the class consisting of 0 and 1, the methylene radical attached to the imino grouping being attached directly when $n$ is 1, to any carbon atom of the divalent radical represented by A. The scope of the invention also includes copolymers prepared from the aforementioned substituted ureas, as well as methods of preparing the said substituted ureas and copolymers.

Illustrative examples of divalent radicals represented by A in the aforementioned general formula for the substituted urea are: ethylene, propylene (trimethylene), butylene, isobutylene, pentylene, isopentylene, hexylene, and other divalent saturated aliphatic hydrocarbon radicals including divalent saturated cycloaliphatic hydrocarbon radicals, e. g., cyclopentylene, cyclohexylene, cycloheptylene, etc.; phenylene, naphthylene, biphenylene, and other divalent aromatic hydrocarbon radicals; 2,4-tolylene, xylylene, ethyl 2,5-phenylene, propyl 2,4-phenylene, isopropyl 3,4-phenylene, 1-butyl 2,4-naphthylene, and other divalent saturated aliphatic-substituted aromatic hydrocarbon radicals; phenylethylene, phenylpropylene, phenylbutylene, naphthylethylene, naphthylisobutylene, and other divalent aromatic-substituted saturated aliphatic hydrocarbon radicals; as well as radicals that may be classed either as divalent saturated aliphatic-substituted aromatic or divalent aromatic-substituted saturated aliphatic hydrocarbon radicals, e. g., 4,alpha-tolylene, 3,beta-phenylene ethyl, 4,alpha-xylylene, 2,gamma-phenylenebutyl, etc.

Illustrative examples of our new substituted ureas embraced by Formula I are:

N-allyl-N'-phthaloyl urea
N-allyl-N'-dihydrophthaloyl urea
N-allyl-N'-tetrahydrophthaloyl urea
N-allyl-N'-hexahydrophthaloyl urea
N-methallyl-N'-phthaloyl urea
N-methallyl-N'-dihydrophthaloyl urea
N-methallyl-N'-tetrahydrophthaloyl urea
N-methallyl-N'-hexahydrophthaloyl urea
N-(3-butenyl)-N'-phthaloyl urea
N-(3-butenyl)-N'-tetrahydrophthaloyl urea
N-(3-methyl-3-butenyl)-N'-phthaloyl urea
N-(4-pentenyl)-N'-phthaloyl urea
N-(4-methyl-4-pentenyl)-N'-phthaloyl urea
N-(5-hexenyl)-N'-phthaloyl urea
N-(5-hexenyl)-N'-hexahydrophthaloyl urea
N-(5-methyl-5-hexenyl)-N'-phthaloyl urea
N-(10-hendecenyl)-N'-phthaloyl urea
N-(10-hendecenyl)-N'-dihydrophthaloyl urea
N-(p-vinylbenzyl)-N'-phthaloyl urea
N-(o-vinylbenzyl)-N'-tetrahydrophthaloyl urea
N-(o-isopropenylbenzyl)-N'-phthaloyl urea
N-(vinylnaphthylmethyl)-N'-phthaloyl ureas The present invention also provides compositions comprising a product of polymerization of a polymerizable mixture of copolymerizable ingredients including (1) a compound or a plurality (e. g., 2, 3, 4 or any number) of compounds of the kind embraced by Formula I and (2) an ethylenically unsaturated compound selected from the class consisting of (a) styrene, (b) acrylic esters (e. g., methyl acrylate, ethyl acrylate, n-propyl acrylate, allyl acrylate, methallyl acrylate, n-butyl acrylate, lauryl acrylate, crotyl acrylate, tolyl acrylate, benzyl acrylate, phenyl acrylate, cyclohexyl acrylate, etc.) and (c) mixtures of (a) and (b).

The amount of the substituted urea (or ureas) which is present in the aforementioned polymerizable mixture can be varied over fairly wide limits, but is generally within the range of from 1% (about 1%) to 20% (about 20%), more particularly from about 2% to about 15% (e. g., about 5% to about 10%) by weight of the total amount of substituted urea (or ureas) and co-monomer or comonomers which are present in the polymerizable mixture. In emulsion or in bulk copolymerization the upper amount of the substituted urea which can be incorporated into the polymerizable mixture and into the copolymer composition is determined largely by the amount thereof which is readily compatible or which can be rendered readily compatible (as by the introduction of still another monomer or monomers, e. g., acrylonitrile, vinyl acetate, etc.) with the acrylic ester. Although the use of amounts of substituted urea above about 20% by weight of the total amount of substituted urea and acrylic ester (or esters) in the polymerizable mixture is not precluded, no particular advantage appears to accrue therefrom in so far as the final copolymer compositions are concerned. Furthermore, with amounts of substituted urea (or ureas) above about 20% by weight of the mixture thereof with the acrylic ester, the copolymerization reaction proceeds less satisfactorily both from the standpoint of economy of operation and simplicity of the process. The amount of substituted urea which is combined in the final copolymer is usually somewhat less (e. g., from, by weight, about 10% to about 65% less) than the amount thereof which is present in the mixture of monomers because of the different rates of polymerization of the substituted urea and comonomer, but in all cases a substantial amount of the substituted urea is combined in the copolymer molecule.

More specific examples of copolymer compositions embraced by the present invention are copolymers of N-allyl-N'-phthaloyl urea and an acrylic ester (e. g., ethyl acrylate) or styrene, which copolymers are produced from mixtures of the said compounds wherein the N-allyl-N'-phthaloyl urea constitutes from about 2% to about 15% by weight of the particular mixture. Still more specific examples of such copolymers are toluene-soluble copolymers of from about 5% to 10% of N-allyl-N'-phthaloyl urea and about 90% to 95% of ethyl acrylate or styrene or mixtures of ethyl acrylate and styrene in any proportions.

In many cases the copolymer compositions of this invention are used (or both prepared and used) in the form of aqueous emulsions or organic-solvent (e. g., benzene, toluene, xylene, etc.) solutions of the copolymer. Particularly useful compositions of the invention are aqueous emulsions of a copolymer of (1) a substituted urea of the kind embraced by Formula I, specifically N-allyl-N'-phthaloyl urea, and (2) an ethylenically unsaturated compound selected from the class consisting of (a) styrene, (b) acrylic esters and (c) mixtures of (a) and (b), which copolymers are produced from a polymerizable mixture of the compounds of (1) and (2) wherein the substituted urea constitutes from about 2% to about 15%, more particularly from about 3% to about 10%, by weight of the aforementioned polymerizable mixture.

It is an object of the present invention to prepare a new class of chemical compounds, more particularly a new class of substituted ureas.

Still another object of the invention is to prepare new polymerization products, more particularly copolymer compositions, from the substituted ureas of the invention.

A further object of the invention is to prepare liquid compositions, e. g., aqueous emulsions, which are especially valuable in treating textile materials, e. g., cotton, wool, rayon, etc., to impart improved properties thereto.

Still another object of the invention is to provide methods by which the products of the invention can be prepared.

Other objects will be apparent to those skilled in the art from the following more detailed description.

To the best of our knowledge and belief, the substituted ureas embraced by Formula I constitute a new class of chemical compounds. These compounds have unusual and characteristic properties which make them particularly valuable, in that they are relatively stable at temperatures up to their melting point, but at their melting point or at somewhat higher temperatures they decompose to yield the starting primary isocyanate and imide from which they were prepared. Furthermore, since our new substituted ureas are free from an isocyanate grouping, they can be used in relationships (e. g., in the form of aqueous emulsions) in which an isocyanate as such either cannot be employed at all because of its reactivity with compounds containing an active hydrogen atom or can be employed only in a limited or not entirely satisfactory manner by the use of suitable modifying agents.

Our new substituted ureas, which may be designated as "masked isocyanates," are useful in textile treating and other applications where isocyanates themselves heretofore have been used or suggested for use. In general, they have limited solubility in water but are readily soluble in alcohol and in mixtures of water and alcohol, as well as in other organic solvents. Although, in general, they show little or no tendency to polymerize alone, they can be copolymerized with other ethylenically unsaturated compounds, especially with vinyl aryl hydrocarbons, e. g., styrene, and with acrylic compounds, e. g., the various acrylic esters, as well as with mixtures of such hydrocarbons and esters. In such copolymer compositions optimum results are obtained, as has been indicated hereinbefore, when the substituted urea constitutes from about 1% to about 20% of the total amount of copolymerizable monomers which are present in the polymerizable mixture.

The copolymers of our invention are useful as agents (or as compounds of agents) for treating woolen and other protein-containing textiles in order to render them resistant to shrinkage, as well as for treating cotton, rayon and other natural and regenerated cellulosic materials to impart improved properties thereto. The copolymers also have utility in coating, adhesive, laminating and molding compositions. For example, the copolymer can be used as a binder for a filler or in pre-treating fillers, e. g., alpha-cellulose, wood flour, etc., prior to incorporation in a molding composition.

The substituted ureas of our invention are prepared, for example, by effecting reaction between (1) a primary isocyanate representing the general formula $CH_2=CR-(A)_n-CH_2-NCO$ where R, A and $n$ have the meanings above given and (2) an imide selected from the class consisting of phthalimide, dihydrophthalimide, tetrahydrophthalimide and hexahydrophthalimide. The reaction preferably is effected while the aforementioned reactants are in contact with each other in a liquid medium in which they are inert and at a temperature ranging from about 20° C. up to the reflux temperature of the reaction mass. Illustrative examples of inert liquid media in which the reactants can be dissolved or dispersed in carrying out the reaction are benzene, toluene, xylene, acetone, chlorobenzene, tetrachloroethane, etc. The use of reaction temperatures below about 20° C., e. g., from about 5° C. to about 18° C. is not precluded, but no particular advantage ordinarily accrues therefrom. The primary isocyanate and the imide reactants are usually employed in equal molar ratios or with the one slightly in molar excess of the other, for instance with the one from 1 to 10 mole per cent in excess of the other.

The reaction between the isocyanate and the imide is materially accelerated when it is effected in the presence of a strong base, more particularly a strong organic or inorganic base, or an alcoholate of an alkali metal. Illustrative examples of such bases are the alkali-metal hydroxides (e. g., sodium and potassium hydroxides); hydroxides of the alkaline-earth metals (e. g., calcium and barium hydroxides); alkali-metal (sodium, potassium, lithium, caesium or rubidium) methoxides, ethoxides, propoxides, n-butoxides, sec.-butoxides, tert.-butoxides, amoxides, hexoxides, octoxides, nonoxides, decoxides, etc.; ammonium hydroxide; organic amines and especially tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like. The preferred base is an alkoxide (alcoholate) of an alkali metal, sodium or potassium methoxide or ethoxide being preferred over alkoxides of other alkali metals mainly for economical reasons and because they are more readily available. The amount of the base may be varied as desired or as conditions may require, but ordinarily the base is employed in an amount ranging from a trace (that is, a small but measurable amount) up to about 2 or 3% by weight of the isocyanate reactant.

It was quite surprising and unexpected that a primary isocyanate of the kind aforementioned would yield, upon reaction with phthalimide or with dihydro-, tetrahydro- or hexahydrophthalimide, a substituted urea which could be isolated from the reaction mass as such. Ordinarily it would be expected that the reaction would be reversible and that a definite compound could not be obtained.

The isocyanates used in practicing our invention can be prepared, for example, by three general methods: the first involves the reaction of the corresponding alkenyl halide with a metallic isocyanate; the second involves the metathesis of the corresponding alkenyl urea and an isocyanate, which latter may be either monofunctional or polyfunctional; while the third involves the reaction of the corresponding amine with phosgene and the dehydrohalogenation of the corresponding acid chloride thereby obtained. Since all of the amines used in the preparation of these isocyanates are attached to a primary carbon atom, they can be produced by the catalytic reduction of a suitable derivative of the corresponding nitrile. Inasmuch as the reduction of the nitrile to the amine would destroy the final unsaturation, it is necessary to protect this grouping during the reduction. This can be done, for example, by the reduction of the corresponding carbinol derivative of the nitrile and subsequent dehydration and reaction with phosgene. The resulting acid chloride is then dehydrohalogenated to yield the isocyanate.

Illustrative examples of primary isocyanates that can be used in producing the substituted ureas of the present invention and which are embraced by the general formula $$CH_2=CR-(A)_n-CH_2-NCO$$

where R, A and n have the meanings hereinbefore given, are listed below:

Allyl isocyanate
Methallyl isocyanate
3-butenyl isocyanate
3-methyl-3-butenyl isocyanate
4-pentenyl isocyanates
4-methyl-4-pentenyl isocyanates
5-hexenyl isocyanates
5-methyl-5-hexenyl isocyanates
10-hendecenyl isocyanates
Vinyl benzyl isocyanates
Isopropenylbenzyl isocyanates
Vinylnaphthylmethyl isocyanates
Isopropenylnaphthylmethyl isocyanates
Vinylbiphenylylmethyl isocyanates
Isopropenylbiphenylylmethyl isocyanates
2-methyl-3-butenyl isocyanate
2,3-dimethyl-3-butenyl isocyanate
2-phenyl-3-butenyl isocyanate
2-phenyl-3-methyl-3-butenyl isocyanate
2-tolyl-3-butenyl isocyanate
2-tolyl-3-methyl-3-butenyl isocyanate
2-methyl-4-pentenyl isocyanate
2-ethyl-4-methyl-4-pentenyl isocyanate
2-phenyl-4-pentenyl isocyanate
2-tolyl-4-methyl-4-pentenyl isocyanate
Allylbenzyl isocyanates
Methallylbenzyl isocyanates
2-benzyl-3-butenyl isocyanate
2-benzyl-4-methyl-4-pentenyl isocyanate
Vinylcyclopentylmethyl isocyanates
Isopropenylcyclohexylmethyl isocyanates
2,2-dimethyl-3-butenyl isocyanate Formulas for the aforementioned primary isocyanates are given in the copending application of Edward L. Kropa and Arthur S. Nyquist, Serial No. 694,156, filed August 30, 1946.

The polymerization products, specifically copolymers, of our invention are prepared by polymerizing a polymerizable mixture containing a substituted urea of the kind embraced by Formula I and a different ethylenically unsaturated compound which is copolymerizable with the substituted urea, more particularly such a compound containing a $CH_2=C<$ grouping, especially styrene or an acrylic ester or a mixture of styrene and an acrylic ester in any proportions, e. g., from 0.5% to 99.5% by weight of the one to from 99.5% to 0.5% by weight of the other.

The mixture of the substituted urea with the other monomeric material can be polymerized under heat, light or heat and light in the presence or absence of a polymerization catalyst such, for instance, as boron fluoride, benzoyl peroxide or other organic peroxide or other catalyst or mixture of catalysts. Ultra-violet light is more effective than ordinary light. We prefer to use heat and a polymerization catalyst in producing our new copolymers. If desired, the mixture of copolymerizable materials can be polymerized in bulk or in dissolved or dispersed state, for instance while dissolved or dispersed in an organic solvent in which the monomers are inert, e. g., benzene, toluene, xylene, dioxane, ethers (e. g., dibutyl ether), esters (e. g., butyl acetate), chlorobenzene, ethylene dichloride, ketones (e. g., methyl ethyl ketone), etc. The mixture of monomers also can be emulsion copolymerized as by first dispersing the monomers in water with the aid of a suitable dispersing agent and thereafter copolymerizing the mixed monomers while thus dispersed. The temperature of polymerization can be varied as desired or as conditions may require, but ordinarily it is within the range of from about 20° C. up to the temperature of decomposition of the monomers, when polymerization (copolymerization) is effected in the absence of a solvent. When polymerization is effected in solution state then, depending, for example, upon the particular catalyst employed, it is generally carried out at the boiling temperature of the solution, but in no case is the temperature so high as to cause excessive, if any, thermal decomposition of the substituted urea or the comonomer with which it is copolymerized. With certain catalysts, e. g., gaseous boron fluoride, polymerization preferably is effected at a temperature below 20° C., for instance in solution state at 0° C. to −80° C.

Various polymerization catalysts can be employed including, for instance, inorganic peroxides such, for example, as barium peroxide, etc.; dialkyl peroxides, e. g., dilauryl peroxide, distearyl peroxide, di-(tert.-butyl) peroxide, etc.; symmetrical diacyl peroxides, e. g., diacetyl peroxide, dilauroyl peroxide, distearoyl peroxide, etc.; unsymmetrical or mixed diacyl peroxides, e. g., acetyl benzoyl peroxides, etc.; the various alkyl hydroperoxides, e. g., tert.-butyl hydroperoxide, etc.

When the monomers are emulsion copolymerized it is preferable to use a catalyst which is water-soluble. The catalyst can be used alone or preferably, as in a redox (reduction-oxidation) system, with a water-soluble activator therefor. Any of the water-soluble redox systems known to be effective in accelerating the polymerization or copolymerization of other compounds containing a $CH_2=C<$ grouping can be employed.

Illustrative examples of water-soluble catalysts are water-soluble, oxygen-yielding peroxy compounds, e. g., the water-soluble peroxides, peracids and persalts, including hydrogen peroxide, organic peroxides, e. g., diacetyl peroxide, urea peroxide, etc., peracetic acid, the various water-soluble persulfates, percarbonates, perborates, perphosphates, etc., e. g., the ammonium and alkali-metal (sodium, potassium, lithium, etc.) salts of percarbonic, peracetic, perboric, perphosphoric, etc., acids; and water-soluble ferric salts capable of yielding ferric ions, including the various ferric alums, e. g., ferric ammonium sulfate (ferric ammonium alum), ferric sodium sulfate, ferric potassium sulfate, etc. Other examples of water-soluble additives comprising a water-soluble catalyst that may be used in practicing the present invention are given in, for instance, U. S. Patents 2,289,540, 2,380,474, -5, -6, -7, 2,380,617, -8, 2,380,710, 2,383,425, 2,384,544, 2,384,571, 2,384,574, 2,388,373, and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e. g. sodium, potassium, etc.) bisulfites, hydrosulfites, thiosulfates, sulfurous acid) or compounds which engender sulfurous acid, e. g., alkali-metal sulfites, ethyl and other alkyl sulfites, etc.), various organic sulfinic acids, e. g., p-toluene sulfinic acid, formamidine acid, etc. If alkali-metal sulfites, e. g., sodium sulfites, or similar compounds which engender sulfurous acid are used, the aqueous solution also should contain a strong acid, e. g., sulfuric acid, etc., in an amount which is at least chemically equivalent to the amount of such a compound engendering sulfurous acid that is employed.

Various azo compounds, e. g., azoisobutyronitrile, or other compounds capable of liberating free radicals can be used, if desired, as the polymerization catalyst.

The amount of catalyst used may be varied widely depending, for example, upon the particular kind of catalyst used and other polymerization conditions, and may range, for instance, from about 0.1% to about 5% or even as high as 10% or more by weight of the total amount of substituted urea and comonomer employed. Generally, the amount of catalyst is within the range of about 0.2% to about 3 or 4% by weight of the total monomers. The amount of polymerization adjuvant or activator, if used, likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e. g., 2 or 3 or more moles of activator per mole of catalyst, or correspondingly larger proportions on a chemical equivalent basis, but no particular advantages ordinarily accrue therefrom.

The polymerization (copolymerization reaction can be effected, if desired, while the monomeric mixture or solution or dispersion containing the same is maintained under an atmosphere of an inert gas, for example nitrogen, helium, carbon dioxide, etc.; or, it may be carried out under an atmosphere of air.

In some cases, as in the treatment of textiles, leather, paper, etc., the emulsion of the copolymer can be used directly. In other instances, when the isolated copolymer is desired, it can be separated from the emulsion by freezing the emulsion followed by warming, whereupon the emulsion "breaks" and the copolymer then can be separated, as by filtration or centrifuging, from the aqueous phase. Alternatively, coagulation of the copolymer can be effected by the addition of a water-miscible solvent, e. g., methanol, acetone, etc., or by adding a suitable electrolyte, e. g., aluminum sulfate. The isolated copolymer is then washed to remove the dispersing agent and other impurities.

In order that those skilled in the art better may understand how the present invention can be carried into effect, the following examples are given by way of illustration and not by way of limitation. All parts and percentages are by weight.

*Example 1*

This example illustrates the preparation of N-allyl-N'-phthaloyl urea, the formula for which is II $\quad CH_2=CH-CH_2-NH-\overset{O}{\underset{}{C}}-N\overset{\overset{O}{\underset{}{C}}}{\underset{\underset{O}{\underset{}{C}}}{}}\diagup\diagdown$

|  | Parts | Approx. Molar Ratio |
| --- | --- | --- |
| Allyl isocyanate | 100.0 | 1 |
| Phthalimide | 177.0 | 1 |
| Acetone (dry) | 1,000.0 |  |
| Sodium methylate | about 0.8 |  |

The allyl isocyanate in one-half (500 parts) of the dry acetone is added at about 25° C. to a slurry (also at about 25° C.) of the phthalimide in the remaining 500 parts of dry acetone. The reaction mass is then brought to reflux by placing the reaction vessel containing the same, and which is provided with a reflux condenser, on a steam bath. After heating for 3 hours under reflux, during which time some reaction takes place, about 0.8 part of sodium methylate is added to the mass, and heating under reflux is continued for an additional 5 minutes. All the solid matter dissolves and a clear solution is obtained. The hot solution is allowed to stand for about 16 hours at room temperature, after which about 80% of the acetone is removed from the reaction mass by distillation. The reaction mass containing the N-allyl-N'-phthaloyl urea solidifies upon cooling. It is dried in a vacuum desiccator for about 8 hours. The yield of the vacuum-dried crude product is 97.5% of the theoretical. The crude product is purified, e. g., by recrystallization from benzene or a mixture of water and alcohol, to obtain N-allyl-N'-phthaloyl urea melting at 120°–123° C. and decomposing at 130°–135° C.

When N-allyl-N'-phthaloyl urea is thermally decomposed, the decomposition products are mainly allyl isocyanate and phthalimide. This is shown by the results of the following test:

Into a suitable vessel was placed 11.5 parts of N-allyl-N'-phthaloyl urea, and the substituted urea was heated therein at 140° C. by placing the vessel in a heated oil bath. Some decomposition took place but the procedure was slow because of poor heat transfer through the mass of the substituted urea. Fifty (50) parts of dry xylene was therefore added to the vessel to provide better heat transfer and to aid in the removal of the allyl isocyanate. Distillation began at a vapor temperature of 85° C. and rose during the course of the distillation to 132° C. Approximately 70% (about 35 parts) of the xylene co-distilled with the allyl isocyanate.

Five (5) parts of aniline in about 8.7 parts of dry xylene was added to the distillate of allyl isocyanate and xylene. Upon heating the resulting mixture to reflux and then cooling in an ice bath, crystals of N-allyl-N'-phenyl urea separated. These crystals had a melting point of 108°–110° C., and a mixed melting point thereof with a known sample of N-allyl-N'-phenyl urea (M. P. 110°–113° C.) showed no depression.

The residue from the pyrolysis completely crystallized to yield a fine crop of phthalimide crystals. The yield of crude phthalimide crystals recovered from the thermal decomposition was approximately 102% of the theoretical.

*Example 2*

N-methallyl-N'-phthaloyl urea is produced in essentially the same manner as described under Example 1 with reference to the production of N-allyl-N'-phthaloyl urea with the exception that 1169 parts of methallyl isocyanate is used in place of 1000 parts of allyl isocyanate.

*Example 3*

|  | Parts | Approx. Molar Ratio |
| --- | --- | --- |
| Allyl isocyanate | 200.0 | 1 |
| Phthalimide | 354.0 | 1 |
| Acetone (dry) | 2,000.0 |  |
| Sodium methylate | 1.6 |  |

All of the above ingredients are heated together under reflux for 30 minutes. Approximately 90% of the acetone is removed by distillation. Upon cooling, the residue containing N-allyl-N'-phthaloyl urea solidifies. About 132 parts of hexane is added to the cooled residue. Upon warming the resulting mass, the substituted urea dissolves in the hexane. Colorless crystals of N-allyl-N'-phthaloyl urea, melting point 120°–125° C., separate from the solution when it is cooled.

*Example 4*

A warm solution of 5 parts of N-allyl-N'-phthaloyl urea in 45 parts of ethyl acrylate is added to the following warm solution while stirring under reflux:

|  | Parts |
| --- | --- |
| Water | 150.0 |
| Sodium lauryl sulfate (dispersing agent) | 0.75 |
| Ammonium persulfate (polymerization catalyst) | 0.05 |

The mixture is heated and stirred for 1½ hours at about 90° C. in a reaction vessel placed on a steam bath. At the end of this period the emulsion is steamed for about 15 minutes to remove residual monomer, cooled and strained through a coarse cloth. The resulting emulsion containing a copolymer of N-allyl-N'-phthaloyl urea and ethyl acrylate is diluted with water to 10% of copolymer solids and is then used in the treatment of wool as described below:

A piece of woolen goods (9" x 23" in size) is immersed in the aqueous emulsion of the copolymer and passed through squeeze rolls. The wet impregnated wool containing approximately 8 to 10% of copolymer solids is framed, air-dried for a short period and is then heated for 9 minutes at 290° F. After cooling to room temperature the sample is removed from the frame, allowed to remain undisturbed for about 16 hours and is then measured prior to laundering. The method of laundering is a modification of the standard method of the A. A. T. C. C. and involves heating for 20 to 30 minutes at 240° F. while drying after each washing. After a cycle of five washing (10 minutes in soap solution) and drying operations, the dried treated cloth shows a shrinkage of only 3.1%. In marked contrast, when a sample of the untreated woolen goods is similarly laundered it shows a shrinkage of 17%.

When cotton and rayon fabrics are similarly treated with the same aqueous emulsion of copolymer, an appreciable but less marked reduction in shrinkage is obtained. The tensile strength of the goods is not reduced by the treatment and there is some improvement in its resistance to creasing.

*Example 5*

Same as Example 4 with the exception that 95 parts instead of 45 parts of ethyl acrylate is used. Similar results are obtained.

*Example 6*

Exactly the same procedure is followed as described under Example 4 with the exception that 45 parts of styrene is used in place of 45 parts of ethyl acrylate. The yield of copolymer solids in the emulsion is about 80% of the theoretical. Shrinkage of cotton is reduced by treatment with the aqueous emulsion containing about 10% of the copolymer of styrene and N-allyl-N'-phthaloyl urea, followed by drying and heating as described in the preceding example.

Example 7

Same as Example 6 with the exception that 95 parts instead of 45 parts of styrene is used. Similar results are obtained.

Example 8

The same procedure is followed as described under Example 4 with the exception that 45 parts of benzyl acrylate is used in place of 45 parts of ethyl acrylate, 1.5 parts instead of 0.75 part of sodium lauryl sulfate is employed, and the polymerization period is 2 hours instead of 1½ hours. A good yield of copolymer of benzyl acrylate and N-allyl-N'-phthaloyl urea is obtained.

If desired, higher amounts of comonomer than that employed in the foregoing examples can be used with the substituted urea in forming a copolymer thereof with an ethylenically unsaturated compound such as styrene and acrylic esters (e. g., isopropyl acrylate, sec.-butyl acrylate, amyl acrylate, octyl acrylate, octadecyl acrylate and others such as those mentioned hereinbefore by way of illustration), for instance from 100 to 500 parts of the comonomer (or mixture of comonomers) to each 5 parts of the substituted urea. Ordinarily the amount of N-allyl-N'-phthaloyl urea or other substituted urea of the kind with which this invention is concerned does not exceed about 10 or 15% of the total weight of the mixture of monomers, since at the higher percentage proportions greater difficulty is encountered, using bulk or emulsion copolymerization technique, in dissolving (or rendering compatible) the substituted urea with the other comonomer. The lower amount of substituted urea can be as little as 1%, but preferably it is at least about 2 or 3% (e. g., about 5–10%) of the total weight of the mixture of copolymerizable monomers. Amounts above 15%, e. g., 20% or even as much as 25–50% or more of the substituted urea, based on the total weight of the mixture of monomers, readily can be employed by solution copolymerization of the monomers while dissolved in a mutual solvent.

Example 9

This example illustrates the solution copolymerization of an acrylic ester, specifically ethyl acrylate, with a substituted urea of the kind with which the present invention is concerned, more particularly N-allyl-N'-phthaloyl urea.

| | Parts |
|---|---|
| Ethyl acrylate | 45.0 |
| N-allyl-N'-phthaloyl urea | 5.0 |
| Anhydrous toluene | 50.0 |
| Azoisobutyronitrile (polymerization catalyst) | 0.25 | are heated together under reflux at the boiling temperature of the mass, yielding a toluene solution of a copolymer of ethyl acrylate and N-allyl-N'-phthaloyl urea. The solution is cooled and then diluted with dry toluene to 450 parts (approximately 10% of copolymer solids). The solution is clear and pale yellow in color.

(Similar results are obtained when 45 parts of styrene is substituted for 45 parts of ethyl acrylate in the above formulation).

A sample of woolen goods is impregnated with this copolymer solution in essentially the same manner as described under Example 1 with reference to the treatment of wool with an aqueous emulsion of a similar copolymer. After a cycle of 5 washing and drying operations as described under Example 1, the dried treated cloth shows a shrinkage of 10% as compared with 17% for the untreated wool.

Example 10

An emulsion copolymer of ethyl acrylate and N-allyl-N'-phthaloyl urea is prepared as described under Example 1. Unsized sheets of paper are impregnated by saturation with the emulsion at various concentrations of copolymer solids so that the treated paper contains the percentages, by weight, of copolymer shown below. After drying, the treated sheets are conditioned and tested by standard methods. The results of tests on the untreated and treated paper are as follows:

| | Untreated Paper | Treated Paper, Per cent of Copolymer Contained Therein | | | |
|---|---|---|---|---|---|
| | | 8.4 | 14.6 | 28.0 | 40.5 |
| Mullen bursting strength, lbs./sq. in. | 9.0 | 20.0 | 25.0 | 38.0 | 53.0 |
| Dry tensile strength, lb./in. (with machine direction) | 6.2 | 10.6 | 15.2 | 19.4 | 21.8 |
| Wet tensile strength, lbs./in. (with machine direction) | 0.4 | 3.6 | 3.6 | 5.6 | 7.6 |
| Per cent Elongation, dry sheet (with machine direction) | 0.7 | 3.3 | 3.8 | 5.8 | 6.5 |
| Per cent Elongation, wet sheet (with machine direction) | 2.5 | 5.9 | 6.5 | 9.1 | 12.2 |

Example 11

Same as in Example 1 with the exception that instead of 45 parts of ethyl acrylate there are used 22.5 parts of styrene and 22.5 parts of ethyl acrylate. Similar results are obtained.

Example 12

| | Parts |
|---|---|
| Styrene | 97–99 |
| N-allyl-N'-phthaloyl urea | 1–3 |
| Benzoyl peroxide | 0.5 | are mixed together and charged to a heavy-walled glass tube, which thereafter is sealed under vacuum. Polymerization of the polymerizable liquid is allowed to proceed for 7 days at room temperature (20°–30° C.) and then for from 3–7 days at 60° C. to yield a hard copolymer of styrene and N-allyl-N'-phthaloyl urea. It can be used alone or admixed with a dye, pigment, plasticizer, opacifier, filler or other effect agent, as a thermoplastic molding composition.

Example 13

Same as Example 12 with the exception that 97–99 parts of methyl acrylate is used instead of 97–99 parts of styrene and the time of polymerization at 60° C. is only 2–3 days. The resulting copolymer of methyl acrylate and N-allyl-N'-phthaloyl urea is softer than the copolymer of Example 12. It can be used as a component of coating compositions.

Example 14

This example illustrates the preparation of N-allyl-N'-tetrahydrophthaloyl urea, the formula for which is

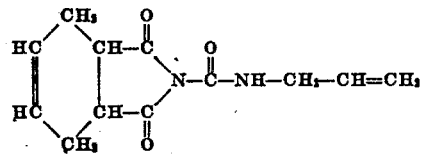

|  | Parts | Approx. Molar Ratio |
|---|---|---|
| Allyl isocyanate | 125 | 1 |
| Tetrahydrophthalimide | 226 | 1 |
| Acetone (dry) | 1,000 |  |
| Sodium methoxide | 1 |  |

The first three ingredients are mixed together at room temperature (about 30° C.), but the tetrahydrophthalimide does not completely dissolve. A clear solution results upon heating the reaction mixture to reflux. Heating under reflux at the boiling temperature of the mass is continued for 30 minutes. The extent of the reaction in the absence of sodium methoxide (sodium methylate) is observed by cooling the solution in an ice bath and noting the amount of tetrahydrophthalimide which crystallizes from the solution. The reaction is now accelerated by adding 1 part of sodium methoxide and heating under reflux at boiling temperature for 15 minutes, after which the reaction mass again is cooled in an ice bath. Since a small amount of tetrahydrophthalimide separates, indicating that the reaction has not been completed, the reaction mass is heated for another period of 15 minutes under reflux. No imide separates upon cooling the solution, which is indicative of the completion of the reaction.

The acetone is removed by first distilling at atmospheric pressure and then under vacuum, after removing 80% of the acetone by distillation at atmospheric pressure, until an additional 10% of acetone has been removed. The residual yellow oil comprising crude N-allyl-N'-tetrahydrophthaloyl urea does not crystallize as readily as crude N-allyl-N'-phthaloyl urea which is similarly prepared from allyl isocyanate and phthalimide. When the crude product is cooled to +5° C., the oil is converted into a semi-solid mush.

The reaction vessel containing the crude substituted urea is placed in a vacuum desiccator and evacuated to remove any residual acetone. After about 16 hours in the desiccator, the crude product is solid enough to be removed from the vessel. The product is further dried in the desiccator for an additional 40 hours, at the end of which period it is completely solid at room temperature. A purer product having an apparent melting point of 75°–80° C. is obtained by recrystallizing the crude product from a benzene-hexane solution thereof. The melting point is partly obscured by the formation of tiny bubbles in the melt, which is presumably due to the decomposition of the substituted urea to yield allyl isocyanate at or slightly above the melting point of the urea compound. As the temperature is raised, these bubbles coalesce and a gas (identified as allyl isocyanate by its odor) is evolved as evidenced by the rising melt in the capillary tube. The N-allyl-N'-tetrahydrophthaloyl urea decomposes slowly from its melting point up to 150° C. The decomposition is not as vigorous at the higher temperatures as is the decomposition of N-allyl-N'-phthaloyl urea.

N-allyl-N'-dihydrophthaloyl urea and N-allyl-N'-hexahydrophthaloyl urea are prepared in essentially the same manner as described above, using equivalent amounts of dihydrophthalimide or hexahydrophthalimide in place of tetrahydrophthalimide.

*Example 15*

This example illustrates the solution copolymerization of N-allyl-N'-tetrahydrophthaloyl urea and methyl acrylate.

|  | Parts |
|---|---|
| N-allyl-N'-tetrahydrophthaloyl urea | 20.0 |
| Methyl acrylate | 80.0 |
| Benzoyl peroxide | 0.1 |
| 1,4-Dioxane | 100.0 | are thoroughly mixed in a closed container and then heated for 20 hours at 50° C. to yield a clear, viscous, syrupy solution of a copolymer of methyl acrylate and N-allyl-N'-tetrahydrophthaloyl urea. A dried film is rubbery and slightly tacky.

*Example 16*

A mixture of

|  | Parts |
|---|---|
| N-allyl-N'-tetraphydrophthaloyl urea | 15.0 |
| Cycyohexyl acrylate | 85.0 |
| Benzoyl peroxide | 0.1 | is heated for 20 hours at 50° C. to yield a viscous, resinous copolymer of N-allyl-N'-tetrahydrophthaloyl urea and cyclohexyl acrylate.

It will be understood, of course, by those skilled in the art that our invention is not limited to the particular substituted ureas and copolymers or to the particular methods of preparing the same given by way of illustration in the foregoing examples. For instance, other substituted ureas of the kind embraced by Formula I can be prepared in a manner similar to that set forth in certain of the examples by using, instead of allyl isocyanate or methallyl isocyanate, an equivalent amount of any other primary isocyanate represented by the general formula

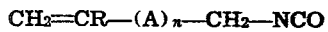

$$CH_2=CR-(A)_n-CH_2-NCO$$

where R, A and $n$ have the meanings hereinbefore given, and phthalimide, or di-, tetra- or hexahydrophthalimide. Numerous illustrative examples of the substituted ureas of our invention have been given previously, and others will be apparent from the foregoing description and from the examples of primary isocyanates named by way of illustration.

Likewise, acrylic esters (or mixtures of acrylic esters) other than methyl acrylate, ethyl acrylate, benzyl acrylate and cyclohexyl acrylate can be employed in preparing the copolymer compositions of this invention, for instance isobutyl acrylate, tert.-butyl acrylate, isoamyl acrylate, hexyl acrylate, nonyl acrylate, decyl acrylate, cinnamyl acrylate, phenylethyl acrylate and others such as those previously given by way of illustration. The acrylic ester employed can be either an esterification product of acrylic acid with a monohydric alcohol or with a polyhydric alcohol. Illustrative examples of the latter are the mono- and polyesters of acrylic acid and ethylene glycol, diethylene glycol, triethylene glycol, tetraethylene glycol, tetramethylene glycol, hexamethylene glycol, octamethylene glycol, decamethylene glycol, glycerol, pentaerythritol, di- and other polypentaerythritols, sorbitol, etc. We prefer to use as the comonomer with the substituted urea either styrene or an ester of acrylic acid and a saturated or unsaturated monohydric alcohol, or a mixture of styrene and such an ester.

It also will be understood by those skilled in the art that we are not limited to the particular methods of copolymerization or to the particular catalysts given by way of illustration in the foregoing examples. Thus, instead of the particular polymerization catalyst employed in the various examples, any other suitable polymerization catalyst or polymerization system (numerous examples of which have been mentioned) can be used.

We claim:

1. A chemical compound of the class of compounds represented by the general formula

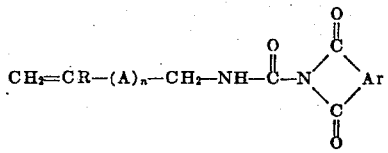

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, Ar represents a member of the class consisting of phenylene, dihydrophenylene, tetrahydrophenylene and hexahydrophenylene radicals, and $n$ represents a value selected from the class consisting of 0 and 1, the methylene radical attached to the imino grouping being attached directly, when $n$ is 1, to any carbon atom of the divalent radical represented by A.

2. N-allyl-N'-phthaloyl urea.

3. N-allyl-N'-tetrahydrophthaloyl urea.

4. A composition comprising a product of polymerization of a polymerizable mixture of copolymerizable ingredients including (1) a compound corresponding to the general formula

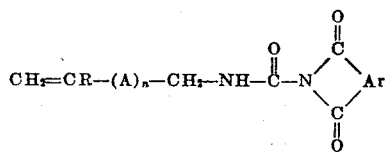

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, Ar represents a member of the class consisting of phenylene, dihydrophenylene, tetrahydrophenylene, and hexahydrophenylene radicals, and $n$ represents a value selected from the class consisting of 0 and 1, the methylene radical attached to the imino grouping being attached directly, when $n$ is 1, to any carbon atom of the divalent radical represented by A, and (2) an ethylenically unsaturated compound selected from the class consisting of (a) styrene, (b) acrylic esters and (c) mixtures of (a) and (b), the amount of the compound of (1) which is present in the said polymerizable mixture being from 1 to 20% by weight of the total of (1) and (2).

5. A composition as in claim 4 wherein the compound of (1) is N-allyl-N'-phthaloyl urea.

6. A composition as in claim 4 wherein the compound of (2) is styrene.

7. A composition as in claim 4 wherein the compound of (2) is ethyl acrylate.

8. A copolymer of N-allyl-N'-phthaloyl urea and ethyl acrylate which is produced from a mixture of said compounds wherein the N-allyl-N'-phthaloyl urea constitutes from about 2% to about 15% by weight of the said mixture.

9. A copolymer of N-allyl-N'-phthaloyl urea and styrene which is produced from a mixture of said compounds wherein the N-allyl-N'-phthaloyl urea constitutes from about 2% to about 15% by weight of the said mixture.

10. An aqueous emulsion of a copolymer of (1) N-allyl-N'-phthaloyl urea and (2) an ethylenically unsaturated compound selected from the class consisting of (a) styrene, (b) acrylic esters and (c) mixtures of (a) and (b), said copolymer being produced from a polymerizable mixture of said compounds of (1) and (2) wherein the N-allyl-N'-phthaloyl urea constitutes from about 2% to about 15% by weight of the said polymerizable mixture.

11. A toluene-soluble copolymer of from about 5–10% of N-allyl-N'-phthaloyl urea and about 90–95% of ethyl acrylate.

12. A toluene-soluble copolymer of from about 5–10% of N-allyl-N'-phthaloyl urea and about 90–95% of styrene.

13. The method of preparing a chemical compound of the class of compounds represented by the general formula

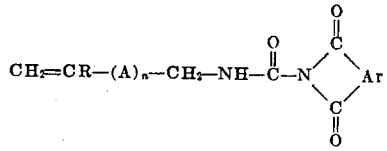

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, Ar represents a member of the class consisting of phenylene, dihydrophenylene, tetrahydrophenylene and hexahydrophenylene radicals, and $n$ represents a value selected from the class consisting of 0 and 1, the methylene radical attached to the imino grouping being attached directly, when $n$ is 1, to any carbon atom of the divalent radical represented by A, said method comprising effecting reaction between (1) a primary isocyanate represented by the general formula $CH_2=CR-(A)_n-CH_2-NCO$ where R, A and $n$ have the meanings above given and (2) an imide selected from the class consisting of phthalimide, dihydrophthalimide, tetrahydrophthalimide and hexahydrophthalimide, said reaction being effected while the said reactants are in contact with each other in a liquid medium in which they are inert and at a temperature ranging from about 20° C. up to the reflux temperature of the reaction mass, and isolating a compound represented by the first formula above-mentioned from the resulting reaction mass.

14. The method of preparing a new synthetic composition which comprises polymerizing under heat and in the presence of a polymerization catalyst a polymerizable mixture containing copolymerizable ingredients including (1) a compound corresponding to the general formula

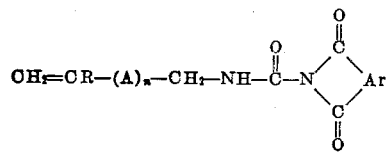

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, Ar represents a member of the class consisting of phenylene, dihydrophenylene, tetrahydrophenylene, and hexahydrophenylene radicals, and $n$ represents a value selected from the class consisting of 0 and 1, the methylene radical attached to the imino grouping being attached directly, when $n$ is 1, to any carbon atom of the divalent radical represented by A, and (2) an ethylenically unsaturated compound selected from the class consisting of (a) styrene, (b) acrylic esters and (c) mixtures of (a) and (b), the amount of the compound of (1) which is present in the said polymerizable mixture being from 1 to 20% by weight of the total of (1) and (2).

ERHART K. DRECHSEL.
WALTER M. THOMAS.

No references cited

Certificate of Correction

August 1, 1950

Patent No. 2,516,836

ERHART K. DRECHSEL ET AL.

It is hereby certified that error appears in the printed specification of the above numbered patent requiring correction as follows:

Column 4, line 49, for the word "compounds" read *components*; line 63, for "representing" read *represented by*; column 7, line 73, for "sodium sulfites" read *sodium sulfite*; column 8, line 31, after "copolymerization" insert a closing parenthesis; column 12, line 46, for "liquid" read *mixture*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*